(12) United States Patent
Bertin (10) Patent No.: US 7,685,615 B2
(45) Date of Patent: Mar. 23, 2010

(54) TELEVISION SIGNAL RECEPTION METHOD AND MODULE

(75) Inventor: Christian Bertin, Rennes (FR)

(73) Assignee: France Telecom, Paris (FR)

( * ) Notice: Subject to any disclaimer, the term of this patent is extended or adjusted under 35 U.S.C. 154(b) by 930 days.

(21) Appl. No.: 10/572,298

(22) PCT Filed: Sep. 8, 2004

(86) PCT No.: PCT/FR2004/002276

§ 371 (c)(1),
(2), (4) Date: Mar. 14, 2006

(87) PCT Pub. No.: WO2005/029860

PCT Pub. Date: Mar. 31, 2005

(65) Prior Publication Data

US 2007/0118850 A1    May 24, 2007

(30) Foreign Application Priority Data

Sep. 16, 2003    (FR) .................................... 03 10847

(51) Int. Cl.
*H04N 7/10* (2006.01)
(52) U.S. Cl. ........................................ 725/32; 348/553
(58) Field of Classification Search ........................ None
See application file for complete search history.

(56) References Cited

U.S. PATENT DOCUMENTS 6,240,555 B1 * 5/2001 Shoff et al. ................. 725/110
6,324,694 B1 * 11/2001 Watts et al. .................... 725/32
2003/0126619 A1 * 7/2003 Moon .......................... 725/120
2003/0192045 A1 * 10/2003 Fellenstein et al. ............ 725/29
2004/0261128 A1 * 12/2004 Fahy et al. ................... 725/136

FOREIGN PATENT DOCUMENTS

| WO | WO 00/20976 A | 4/2000 |
| WO | WO 02/060181 A | 8/2002 |
| WO | WO 02/071760 A | 9/2002 |

* cited by examiner

*Primary Examiner*—John W Miller
*Assistant Examiner*—Chenea P Smith
(74) *Attorney, Agent, or Firm*—Cohen Pontani Lieberman & Pavane LLP (57) ABSTRACT

According to the invention, in the method of receiving broadcast television signals:

a main component (C1) is received (E6) in a multimedia receiver terminal (T);

a secondary component (C2) is acquired (E5) in the multimedia receiver terminal (T) via a remote computer network (R), main time stamps (TSFCS1) referenced to a predetermined reference time (TSFCS10) being inserted beforehand into the main component (C1), and secondary time stamps (TSFCS2) referenced to said predetermined reference time (TSFCS10) being inserted into the secondary component (C2) prior to reproduction, the time stamps marking content reproduction advance; and the received main component (C1) and the acquired secondary component (C2) are reproduced (E6) on the multimedia receiver terminal (T) in compliance with the chronology of the secondary time stamps and the main time stamps, to reproduce for the user a coherent audiovisual content made up both of the main component (C1) and of the secondary component (C2).

18 Claims, 3 Drawing Sheets

TELEVISION SIGNAL RECEPTION METHOD AND MODULE

RELATED APPLICATIONS

This is a U.S. National Phase Application under 35 USC 371 of International Application PCT/FR2004/002276, filed on 8 Sep. 2004.

FIELD OF THE INVENTION

The invention relates to a method of receiving television signals.

One field of the invention is that of televisions or other apparatus for receiving television signals and more generally audiovisual content over television channels.

BACKGROUND OF THE INVENTION

Television signals conventionally carry simultaneously the picture and the soundtrack of the audiovisual content to be reproduced by the user's television.

There is an increasing requirement to expand the audiovisual content on offer. Thus data that the user can consult on a television may be added to the picture and soundtrack.

However, the information that is broadcast must be adapted to the necessarily limited bandwidth of television channels, which restricts the volume of information that can be broadcast.

SUMMARY OF THE INVENTION

The invention aims to provide a method of receiving television signals on a multimedia receiver terminal that alleviates the drawbacks of the prior art and expands the possibilities of supplying content to the user.

To this end, a first aspect of the invention consists in a method of receiving broadcast television signals on a multimedia receiver terminal, in which method a main component of the television signals broadcast via a first network is received in the multimedia receiver terminal, and which method is characterized in that:

- main time stamps referenced to a predetermined reference time are inserted beforehand into the main component to mark content reproduction advance;
- a secondary component for associating with the main component in order to reproduce for the user a coherent audiovisual content made up both of the main component and of the secondary component is acquired in the multimedia receiver terminal via a remote second network of computers including a source adapted to send secondary components, secondary time stamps referenced to said predetermined reference time being inserted into the secondary component prior to reproduction in order to mark content reproduction advance; and
- the received main component and the acquired secondary component are reproduced on the multimedia receiver terminal in compliance with the chronology of the secondary content reproduction advance time stamps and the main content reproduction advance time stamps, to reproduce for the user a coherent audiovisual content made up both of the main component and of the secondary component.

By means of the invention, the secondary component usually carried by the television signals containing the main component can be replaced by a secondary component from the second network, which is not the television signal broadcast network. Consequently, the invention circumvents the limitations imposed by broadcast television signals on the secondary component. This capitalizes on the offer of secondary components from the second network, which is potentially much greater than the offer from the television signal broadcasting network, and on its ease of access.

Accordingly, if the secondary component is the soundtrack and/or corresponding subtitles, for example, the subtitles may be viewed on the multimedia receiver terminal in a language other than that imposed by the television signals, provided that the soundtrack and/or the corresponding subtitles in that language are available in the secondary component sent to the multimedia receiver terminal via the second network. Thus the invention opens the way to simultaneous broadcasting by means of television signals of the same content in more than one country with different languages, for example in more than one country in Europe, with the possibility of obtaining in each country the soundtrack and/or corresponding subtitles in the language of that country.

Synchronizing the main and secondary components enables reproduction on the multimedia receiver terminal of information that is linked in real time to the main component, and not merely information that is not linked in real time to the main component, such as the television program data that is a feature of DVB signaling.

According to other features of the invention:

- the main content reproduction advance time stamps each have a main value of the time elapsed since said predetermined reference time;
- the secondary content reproduction advance time stamps each have a secondary value of the time elapsed since said predetermined reference time; and
- the presence of a main content reproduction advance time stamp in the received main component is detected, the acquired secondary component is searched for a secondary content reproduction advance time stamp having a secondary value greater than or equal to the main value of the detected main content reproduction advance time stamp, and reproduction of the acquired secondary component is started from the secondary content reproduction advance time stamp obtained by means of said search;
- said predetermined reference time is a published start time of reproduction of the content of the main component;
- the main component includes, in addition to said main content reproduction advance time stamps referenced to said predetermined reference time, second main time stamps that are not referenced to said predetermined referenced time and are respectively associated with said main content reproduction advance time stamps referenced to said predetermined referenced time;
- in the secondary component, the secondary content reproduction advance time stamps are modified to have the same time reference as the second main time stamps of the main component by adding to the secondary content reproduction advance time stamps the time shift between the main content reproduction advance time stamps referenced to said predetermined reference time and the second main time stamps that are not referenced to said predetermined reference time and are respectively associated with said main content reproduction advance time stamps; and
- said reproduction of the received main component and the acquired secondary component on the multimedia receiver terminal is effected on the basis of the chronology of the modified secondary content reproduction advance time stamps of the secondary component and the second main time stamps of the received main component, which are not referenced to said predetermined reference time;

the secondary content reproduction advance time stamps are present from the outset in the secondary component acquired from the second network in the multimedia receiver terminal;

or the secondary content reproduction advance time stamps are inserted into the secondary component in the multimedia receiver terminal after acquisition in the multimedia receiver terminal from the second network;

the step of acquiring the secondary component includes storing the secondary component received from the second network in a buffer of the multimedia receiver terminal and the step of reproducing on the multimedia receiver terminal the received main component and the acquired secondary component includes extracting the stored secondary component from the buffer;

the secondary component is acquired by interrogating an address of the source of secondary components to be found in description data present with the main component in the received television signals followed by downloading from the secondary component source to the multimedia receiver terminal;

or the secondary component is acquired by interrogating an address of the source of secondary components to be found in description data present in metadata broadcast independently and received beforehand by the terminal or consulted beforehand by the terminal at a known address, followed by downloading from the secondary component source to the multimedia receiver terminal;

the description data includes for each identifier of a secondary component the secondary component type selected from at least audio, subtitle and video, the secondary component language, and the respective address in the second network at which to obtain the secondary component;

or the secondary component is acquired from the second network with the aid of a manual search engine and downloaded from the second network to the multimedia receiver terminal;

or the secondary component is acquired by sending it to the multimedia receiver terminal over the second network in multicast mode by the secondary component source and storing it in the buffer;

or the secondary component is acquired by downloading it into the buffer and reading the buffer in streaming mode;

the main content reproduction advance time stamps include a main wanted content interruption time stamp and a main wanted content resumption time stamp after the main wanted content interruption time stamp, between which time stamps is a content that is not wanted in the main component, and which time stamps are synchronized in the secondary component respectively with a first secondary wanted content time stamp and a second secondary wanted content time stamp that is after the secondary wanted content time stamp, the secondary component between the first secondary wanted content time stamp and the second secondary wanted content time stamp corresponding to a wanted content other than the unwanted content of the main component.

The invention also provides a module for receiving broadcast television signals, for implementing the method as defined above, the module including means for receiving in a multimedia receiver terminal a main component of television signals broadcast via a first external broadcast network and means for reproducing an audiovisual content for the user based on the received main component, and the module being characterized in that it further includes:

means for acquiring, via the second network of remote computers, said secondary component that must be associated with the main component to reproduce for the user a coherent audiovisual content made up of the main and secondary components; and means for automatically controlling the reproduction means so that they reproduce the received main component and the acquired secondary component in compliance with the chronology of the secondary content reproduction advance time stamps and the main content reproduction advance time stamps.

BRIEF DESCRIPTION OF THE DRAWINGS

The invention can be better understood after reading the following description, which is given by way of non-limiting example only and with reference to the appended drawings, in which.

DETAILED DESCRIPTION OF THE DRAWINGS

Figure 1:
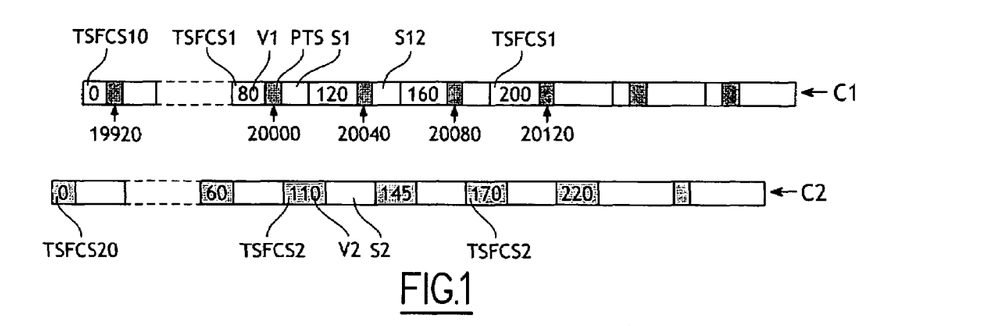
FIG. 1 is a diagram of one example of the temporal structure of main and secondary components according to the invention.

The method of the invention is implemented automatically on a multimedia receiver or multimedia receiver terminal T adapted to receive television signals broadcast by a first source, such as a main broadcaster in FIG. 1, via a first network, for example by radio transmission, satellite, cable, or the Internet, and is adapted to reproduce the audiovisual content thereof for the user by appropriate means, such as a screen and one or more loudspeakers. For example, the terminal T is either a television receiving television signals by radio, satellite, or cable, or a computer or some other terminal receiving television signals via the Internet. The television signals received by the terminal T include a main component C1 for reproducing a content on the terminal.

The main component C1 carried by the television signals includes main (content reproduction advance) time stamps TSFCS1, as shown in FIG. 1. These main time stamps TSFCS1 are inserted during broadcasting via the first network and are therefore present in the main component C1 received by the terminal. The main time stamps TSFCS1 are either inserted into the component C1 during live broadcasting or are initially supplied on a recording medium containing the component C1 if it is not broadcast live, but instead by reading the recording medium. The main time stamps TSFCS1 each contain a main time value V1 equal to the time elapsed (shown in milliseconds in the figures, for example) since a main content start time stamp TSFCS10 of the main component C1, for example situated at a reference time at the start of a television program such as a film or other TV broadcast, etc. This main content start time stamp TSFCS10 is reset at the start of each content. Between consecutive main time stamps TSFCS1 there are the associated samples S1 of the main component C1 that represent portions of the component C1 to be viewed on the terminal T, for example a complete image of the main component C1. The time stamps TSFCS1 indicate the time of reproducing (presenting) the immediately next sample S1 of the main component C1 coming from the appropriate main decoder (audio, video, subtitle, etc.).

Figure 2:
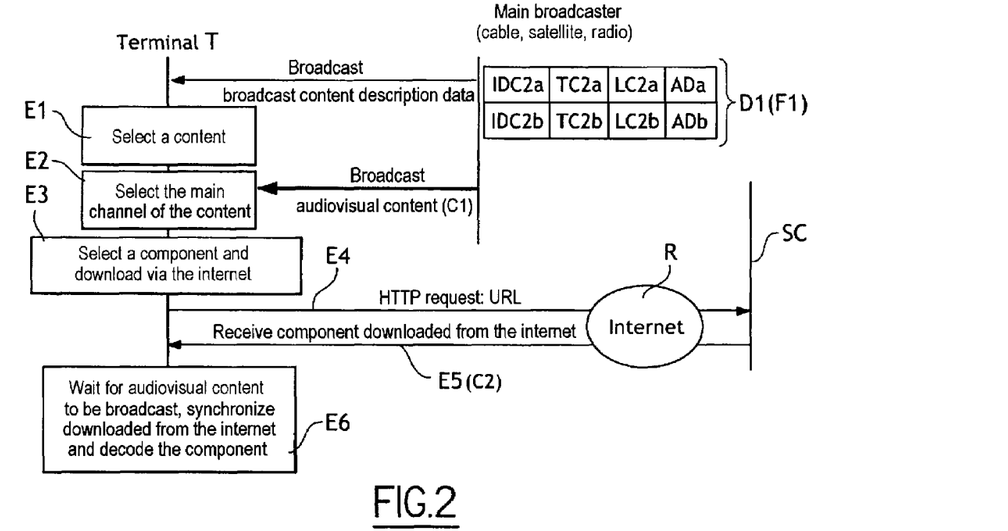
FIG. 2 is a diagram of a first mode of acquisition of a secondary component according to the invention.

In the FIG. 2 embodiment, the broadcast television signals further contain data describing the broadcast content(s), including one or more addresses of one or more secondary components C2 present on a remote source SC and identifiers corresponding to those secondary components C2. This remote secondary component source SC is accessed by the terminal via a second data processing network R such as the Internet.

The user can select the main television channel, i.e. the television broadcast channel, during the step E2 using any appropriate means on the terminal T, and hence the main component C1 to be reproduced on the terminal T. This step E2 may be preceded by a step E1 of selecting a content from a plurality of contents identified in the description data and broadcast on the various television channels.

In the figures, it is assumed that the secondary component C2 codes the soundtrack, for example. The secondary component could equally code subtitles transcribing the soundtrack instead of or in addition to the soundtrack.

During the next step E3, the user can also select a secondary component C2 using any appropriate means on the terminal T and its identifier in the description data associated with the selected main component C1. The component C1 is the picture and soundtrack in French of a film F1, for example. The identifiers of secondary components C2 designated in the description data D1(F1) associated with that component C1 of the film F1 are IDC2a for the soundtrack of the film F1 in English and IDC2b for the soundtrack of the film F1 in German, for example. The description data includes, for each identifier of a secondary component C2, the type (audio, subtitle or video) TC2a, TC2b of the secondary component C2, which is audio in the case of IDC2a and IDC2b, the language LC2a, LC2b of the secondary component C2, which is respectively English and German in the case of IDC2a and IDC2b, and the respective address ADa, ADb at which the secondary component C2 is obtained on the second network R, for example.

The selection of a secondary component C2 at the terminal automatically triggers the sending of a request in the selected secondary component C2 over the second network R during the next step E4 and via a modem included in the terminal T; in the preceding example this second network is assumed to have the identifier IDC2a and therefore the address ADa. The request is of the http, FTP or other type and is sent to the website of the source SC, for example a server. In response to the request, the source SC sends the corresponding secondary component C2 to the address ADa present in the request. The secondary component C2 is then downloaded into the terminal or receiver T via the modem during the step E5. The main component C1 received in the television signals and the downloaded secondary component C2 are then reproduced on the terminal T during the step E6. During this reproduction, the downloaded secondary component C2 is decoded and where appropriate replaces its counterpart in the main channel; in the above example, this means that the soundtrack in English selected as the secondary component C2 replaces the soundtrack in French present in the main channel.

Second content reproduction advance time stamps TSFCS2 are inserted into the secondary component C2 before viewing. In FIG. 1, the secondary time stamps TSFCS2 can be spaced in any manner relative to the main time stamps TSFCS1, for example. The secondary time stamps TSFCS1 each contain a secondary time value V2 equal to the elapsed time (in milliseconds, for example) from a secondary content start time stamp TSFCS20 of the secondary component C2 coinciding with the main content start time stamp TSFCS10 of the main component C1. Consequently, the secondary time stamps TSFCS2 have the same time reference TSFCS20=TSFCS10 as the main time stamps TSFCS1. This secondary content start time stamp TSFCS20 is reset at the start of each content. Between consecutive secondary time stamps TSFCS2 there are the samples S2 of the secondary component C2 which represent the portions of the component C2 to be reproduced on the terminal T, for example the soundtrack for the component C2. The time stamps TSFCS2 indicate the time of reproducing (presenting) the immediately next sample S2 of the secondary component C2 coming from the appropriate secondary decoder.

The samples S1 and S2 in the broadcast component C1 and in the component C2 present on the second network R together form a coherent audiovisual content for the user when reproduced simultaneously on the terminal T. In the previous example, that content consists of a picture and a soundtrack in English that are synchronized, including speech and the lip movements of speakers.

The time stamps TSFCS1 and TSFCS2 may be provided in addition to presentation time stamps (PTS) in the components C1 and C2 in the case of MPEG-2 TS streaming, but are not systematically reset on each change of content and may further be subject to changes of reference and to delays in the event of remultiplexing of television channels in the television signal broadcasting network. These time stamps PTS are known in the art and are shown darker than the time stamps TSFCS1 in FIGS. 1, 4, 5 and 6, with their values in milliseconds 19920, 20000, 20040, 20080, 20120 indicated underneath by an arrow in FIGS. 1 and 6. Thus for two time stamps TSFCS1 and TSFCS2 having the same reference, the time stamps PTS are not guaranteed to have the same reference, which means that synchronization using only the time stamps PTS would not function correctly and would give rise to uncontrollable time shifts between C1 and C2 that would be perceptible to the user.

The source SC inserts the secondary time stamps TSFCS2 into the secondary component C2 at source before acquisition from the second network R or on reception in the terminal T after acquisition from the second network.

Where appropriate, the terminal T includes one or more buffers for storing the secondary component C2 received from the second network R and extracting it therefrom for reproduction.

At the time of reproducing the components C1 and C2 on the terminal T, the secondary time stamps TSFCS2 are automatically synchronized to the corresponding main time stamps TSFCS1 by appropriate means in the terminal T, as described below in the case of a first embodiment.

When a sample S1 of the main component C1 is sent to the main decoder for reproduction, the value V1 of the main time stamp TSFCS1 associated with that main sample S1 indicates to the main decoder the time that has elapsed since the reference time TSFCS10 of that main component C1. If the main decoder has begun decoding before the reference time TSFCS10, the elapsed time corresponds to the start of coding of the current content associated with that reference time TSFCS10.

A main detector in the terminal T detects the last content reproduction advance time stamp TSFCS1 in the received main component C1 and its main time value V1 is extracted from the detected main time stamp TSFCS1.

Appropriate selection means then automatically search the acquired secondary component C2 for the secondary time stamp TSFCS2 having its secondary value V2 greater than or equal to (for example identical to or immediately greater than) the detected main value V1 sent to the selection means, and the secondary time value V2 is extracted from the secondary time stamp TSFCS2 found in this way.

Then, using a local clock of the terminal T, for example, by which the main decoder and the secondary decoder are set, the secondary decoder starts reproduction of the acquired secondary component C2 at the secondary sample S2 corresponding to the secondary time stamp TSFCS2 that has been found at the reproduction time corresponding to the secondary time value V2. The main time stamp TSFCS1 and the secondary stamp TSFCS2 are monitored continuously so that the associated samples S1 and S2 are decoded at the correct time relative to the same start time stamp TSFCS10.

The above embodiment is shown by way of example in FIG. 1, in which the numerical values indicated in C1 and C2 are those in milliseconds of V1 and V2 for the time stamps TSFCS1 and TSFCS2. If the main decoder detects in the sample S1 the time stamp TSFCS1 for which V1=80 milliseconds (ms), it searches C2 for the secondary time stamp TSFCS2 having the lowest value V2 greater than or equal to 80 ms. In this case, the secondary time stamp TSFCS2 for which V2=110 ms will be found in C2. There is a delay of calculated duration DC=V2−V1−DT=110 ms−80 ms−2 ms=28 ms from the time V1+DT before triggering reproduction of the sample S2 after TSFCS2 by the secondary decoder, which reproduction will therefore be effected at the time V2, where DT=2 ms is the processing time that has elapsed since sending the sample S1 to the main decoder, which depends on the sending means that were used for this. In FIG. 1, this reproduction of the sample S2 on the terminal T corresponds to the end of the sample S1 for which V1=80 ms and to the start of the sample S12 following the sample Si for which V1=120 ms.

Where appropriate, reproduction on the terminal T of the components C1 and C2 during the step E6 is automatically delayed pending the start of reception by the terminal T of the television signals including the selected main component C1 associated with the downloaded secondary component C2 (i.e. detection of the start main time stamp TSFCS10), which secondary component C2 is stored in the buffer in the meantime.

The terminal T may miss the first samples S1 and S2, i.e. the first samples after TSFCS10 and TSFCS20. This does not prevent desynchronizing the components C1 and C2 to the decoding process, since decoding is effected under the control of the local clock, which is internal to the terminal T and is locked to the time stamps TSFCS1 of the main component. If the secondary component C2 is downloaded after the start of the selected main component C1, then C1 and C2 are viewed from the detected current main time stamp TSFCS1 of the main component C1.

Alternatively, the description data containing the address of the secondary component source SC is present in metadata broadcast independently and received beforehand by the terminal T or consulted beforehand by the terminal T at a known address.

Figure 3:
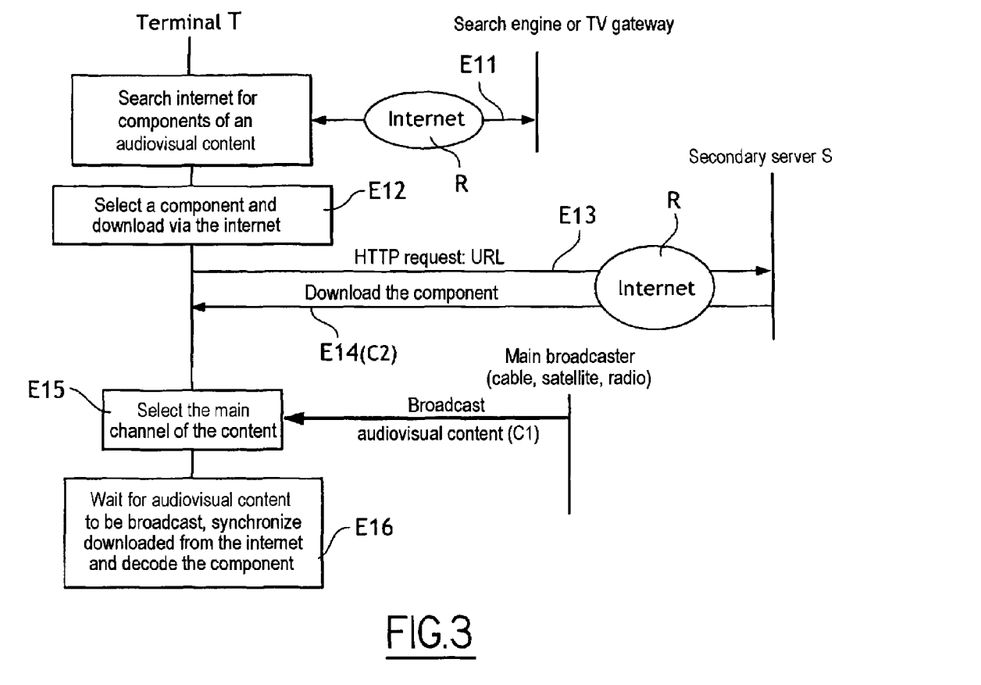
FIG. 3 is a diagram of a second mode of acquisition of a secondary component according to the invention.

In FIG. 3, which is a variant of FIG. 2, no description data is sent to or received by the terminal T, the description data does not contain any indications of secondary components C2 available on the network R or the components C2 available in the description data do not suit the user. In this case, the user is offered manual searching of the second network R for the required secondary component C2 in the step E11, using a search engine present in the terminal T or a television gateway. If the user finds and selects the required secondary component C2 during the step E12, the user commands the sending of a request for acquisition thereof in the step E13, which is analogous to the step E4 in FIG. 2, and its downloading to the terminal T follows in the step E14, which is analogous to the step E5 in FIG. 2.

The main television channel is then selected in the step E15, which is analogous to the step E2 in FIG. 2. During the next step E16, the selected main component C1 of the television signals is received by the terminal T and the main component C1 and the downloaded secondary component C2 are reproduced on the terminal T in a similar manner to the step E6 in FIG. 2.

As an alternative to FIGS. 2 and 3, acquisition of all the secondary components C2 that can be associated with the selected main component C1 is triggered by accessing all the secondary components C2 declared in the description data and/or searching the second network R for all the secondary components C2 linked to a particular main component.

As an alternative to FIG. 2, at the time of its reproduction, the secondary component C2 is read as it passes through the buffer in the terminal T, i.e. in streaming mode, at the same time as portions of the component C2 that are ahead of the read component in time are stored in the buffer. In this case, the request to the source SC is of the RTSP type with the URL address of the required secondary component C2 and the current secondary time stamp TSFCS2 that reproduction on the terminal T has reached. In this case, the source SC is able to send the secondary component C2 from any time indicated in the request (secondary time stamp), to enable the terminal T to ready itself to receive a content at any time. The source SC is able to retime the secondary component that it sends, at the request of the terminal T, if the transit delay of the network R is too great to enable synchronized decoding with no risk of interruption. If the secondary component C2 received at the terminal T is ahead of time, the samples S2 are stored in the buffer to await the corresponding samples S1 of the main component C1. If the secondary component C2 received at the terminal T is delayed, the terminal sends a request to the source SC to command a forward skip in the streaming mode reading of the samples S2 to catch up with the corresponding samples S1 of the main component C1.

In another variant, the secondary component C2 is acquired by the source SC sending it to the terminal over the second network R in multicast mode. In this case, the request to the source SC is of the IGMP type. The secondary component C2 is broadcast by the source SC over the network R at a particular time in advance of the start of the main component C1. The secondary component C2 received is consequently stored in the buffer to wait for the corresponding samples S1 of the main component C1 to be reproduced synchronously with it.

Figure 6:
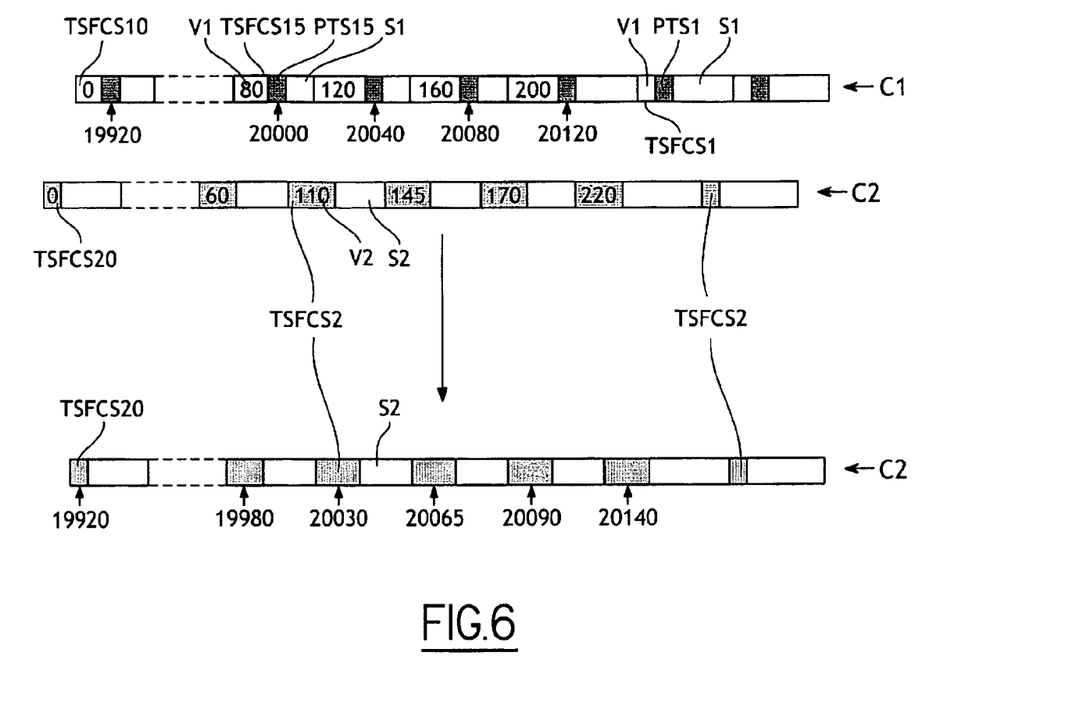
FIG. 6 is a diagram of another example of the temporal structure of the main and secondary components according to the invention.

In a second embodiment shown in FIG. 6, which is a variant of the first embodiment shown in FIG. 1, the main component C1 also includes the second main presentation time stamps PTS1 cited above that are not referenced to the reference time TSFCS10 to which the content reproduction advance stamps TSFCS1 are linked. These second main presentation time stamps PTS1 are also associated with each main sample S1 and are provided after each main time stamp TSFCS1, for example.

Figure 4:
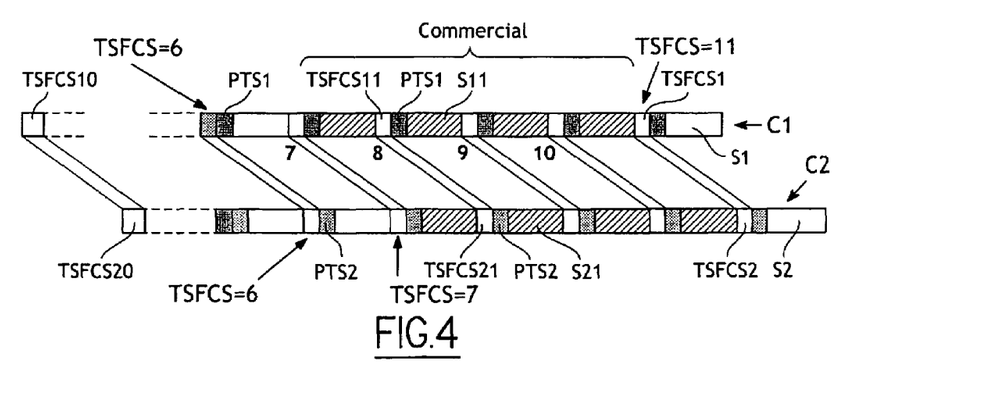
FIG. 4 is a diagram of a first example of the temporal structure of the main and secondary components in the event of insertion of an unwanted content.
Figure 5:
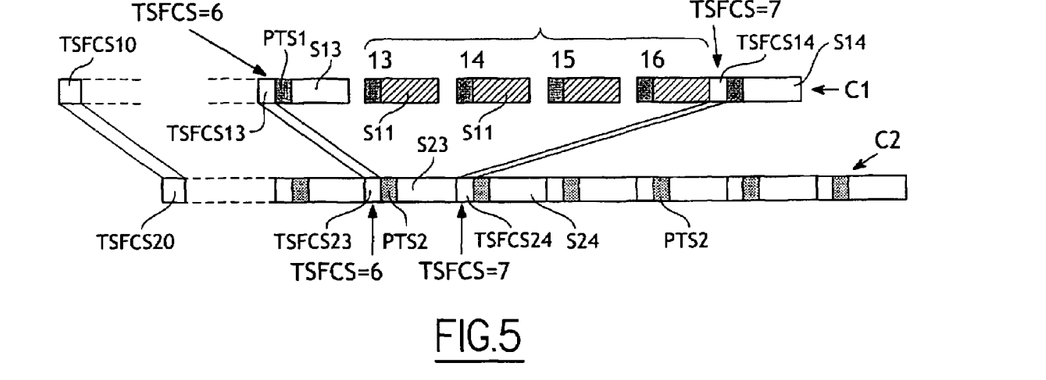
FIG. 5 is a diagram of a second example of the temporal structure of the main and secondary components in the event of insertion of an unwanted content.

As in FIGS. 4 and 5, in the same way, the aforementioned second secondary presentation time stamps PTS2 that are not referenced to the reference time TSFCS20 to which the content reproduction advance secondary time stamps TSFCS2 are referenced are associated with the secondary time stamps TSFCS2, for example follow each of them. These second secondary time stamps PTS2 have any reference time relative to the stamps PTS1 and generally have a reference time different from that of the stamps PTS1.

In FIG. 6, the content reproduction advance secondary time stamps TSFCS2 are modified in the secondary component C2 to give them the same reference time as the second main time stamps PTS1.

To this end, the respective time values of the second main time stamps PTS1 are added to the value V2 of the content reproduction advance secondary time stamps TSFCS2 of C2 and the respective time values V1 of the content reproduction advance main time stamps TSFCS1 associated with the second main time stamps PTS1 in the main component C1 are subtracted therefrom, in accordance with the following formula:

Modified $TSFCS2 = TSFCS2 + PTS1 - TSFCS1$

Given that the consecutive second main time stamps PTS1 have the same time spacing between them as the consecutive content reproduction advance main time stamps TSFCS1 respectively associated with these second main time stamps PTS1, calculation of the content reproduction advance secondary time stamps TSFCS2 may utilize any of the content reproduction advance main time stamps TSFCS1 and the second main time stamp PTS1 associated therewith.

In the FIG. 6 numerical example, for the main content reproduction advance time stamp TSFCS15=80 ms, associated in C1 with the second stamp PTS15=20000 ms, the content reproduction advance secondary time stamps TSFCS2 are modified in accordance with the following formula:

$$\text{Modified } TSFCS2 = TSFCS2 + PTS15 - TSFCS15$$
$$= TSFCS2 + 20000 \text{ ms} - 80 \text{ ms}$$

As indicated by the downward arrow in FIG. 6, the time stamp TSFCS2=110 ms following the detected time stamp TSFCS1 is modified as follows:

$TSFCS2 = 110 \text{ ms} + 20000 \text{ ms} - 80 \text{ ms} = 20030 \text{ ms}$, and the time stamp TSFCS2=145 ms is modified as follows:

$TSFCS2 = 145 \text{ ms} + 20000 \text{ ms} - 80 \text{ ms} = 20065 \text{ ms}$, and so on.

The secondary content reproduction advance time stamps TSFCS2 of C2 are modified before they are passed to the secondary decoder. To calculate the modified secondary time stamps TSFCS2, the second stamp PTS1 associated with TSFCS1 is detected by the main detector, with the current last content reproduction advance main time stamp TSFCS1 in the main component C1 received, and the main time value V1 thereof is extracted from the detected main time stamp TSFCS1 and its value is extracted from the second time stamp PTS1.

The main component C1 and the secondary component C2 are then reproduced on the basis of these modified secondary content reproduction advance time stamps TSFCS2 and the second time stamp PTS1, rather than on the basis of the stamps TSFCS1 and TSFCS2 as previously.

In C2, the modified secondary content reproduction advance time stamps TSFCS2 retain the same reference time as the second stamps PTS1 of C1, but set back by PTS15−TSFCS15=19920 ms relative to the main content start time stamp TSFCS10 of the main component C1.

The situation is discussed below in which the content when broadcast in the television signals is intentionally interrupted by an unwanted content that is not strictly speaking part of the required content and cannot be selected in advance by the user when selecting the required content, this unwanted content consisting of advertising, for example.

A first option, represented in FIG. 4, in which the brace and the shading indicate the unwanted content, is to take account of the unwanted content in the main component C1 and in the secondary component:

by providing in the main component C1 unwanted content main time stamps TSFCS11 referenced to TSFCS10 (as indicated by way of example by TSFCS=6 and TSFCS=11), associated unwanted content main samples S11, wanted content main time stamps TSFCS1 referenced to TSFCS10 (as indicated by way of example by TSFCS=7, 8, 9, 10) and associated wanted content main samples S1, following on from the TSFCS11 and S11; and by providing in the secondary component C2 unwanted content secondary time stamps TSFCS21 referenced to TSFCS20, associated unwanted content secondary samples S21, wanted content secondary time stamps TSFCS2 referenced to TSFCS20 and associated wanted content main samples S2, following on from TSFCS21 and S21.

According to this first option, the unwanted content is reproduced to the user in its entirety with the second component C2.

According to a second option, represented in FIG. 5, in which the brace and the shading designate the unwanted content, there are no unwanted content main time stamps TSFCS11, unwanted content secondary time stamps TSFCS21 or associated unwanted content secondary samples S21. The unwanted content main samples S11 are inserted into the main component C1 between a main wanted content interruption time stamp TSFCS13 (associated with its main wanted sample S13) and a main wanted content resumption time stamp TSFCS14 (associated with its main wanted sample S14) following on from the main wanted content interruption time stamp TSFCS13, as indicated by way of example by TSFCS=6 and TSFCS=7. The main wanted content interruption time stamp TSFCS13 is synchronized in the second component S2 with a secondary wanted content time stamp TSFCS23 associated with its secondary wanted content sample S23 and the main wanted content resumption time stamp TSFCS14 is synchronized in the secondary component S2 with a secondary wanted content time stamp TSFCS24, which is associated with its secondary wanted content sample S24 and follows on from the secondary wanted content time stamp TSFCS23.

Consequently, according to this second option, the secondary component of the unwanted content is not reproduced for the user, but waits for resumption of the main component before resynchronizing the secondary component thereto in TSFCS24, the S23 reproduction duration being that set by S13 and S11. The secondary samples from S24 onwards are therefore placed in a buffer in the terminal T to await the response.

The method of the invention is implemented in the terminal by any appropriate means, for example a receiver module visibly added to the terminal itself and taking the form of a unit that the user can connect to the terminal, or a receiver module incorporated into the terminal and invisible from the outside. This receiver terminal or module is implemented using any electronic or data processing means appropriately programmed to execute the reception method. Accordingly, when the data processing program installed in the receiver module is executed thereby, the usual functioning thereof, consisting in reproducing television signals, is modified by virtue of the fact that the main component C1 and the secondary component C2 are precisely synchronized for reproduction, which is particularly beneficial when the secondary component C2 has a content linked to the main component C1, for example when the main component C2 is speech in a language other than that of the soundtrack accompanying the main component C1 in the television signals.

There is shown below data describing an audiovisual content in accordance with the specifications of the TV Anytime forum (www.tv-anytime.org), after specifying the description of the single-network broadcasting of audiovisual contents:

```
<complexType name="BroadcastEventType">
  <complexContent>
    <extension base="tva:ScheduleEventType">
      <attribute name="serviceIDRef" type="tva:TVAIDRefType"
        use="optional"/>
      <attributeGroup ref="tva:fragmentIdentification"/>
    </extension>
  </complexContent>
</complexType>
<complexType name="ScheduleEventType">
  <complexContent>
    <extension base="tva:ProgramLocationType">
      <sequence>
        <element name="PublishedStartTime" type="dateTime"
          minOccurs="0"/>
        <element name="PublishedEndTime" type="dateTime"
          minOccurs="0"/>
        <element name="PublishedDuration" type="duration"
          minOccurs="0"/>
        <element name="Live" type="tva:FlagType" minOccurs="0"/>
        <element name="Repeat" type="tva:FlagType"
          minOccurs="0"/>
        <element name="FirstShowing" type="tva:FlagType"
          minOccurs="0"/>
        <element name="LastShowing" type="tva:FlagType"
          minOccurs="0"/>
        <element name="Free" type="tva:FlagType" minOccurs="0"/>
      </sequence>
    </extension>
  </complexContent>
</complexType>
<complexType name="ProgramLocationType" abstract="true">
  <sequence>
    <element name="Program" type="tva:CRIDRefType"/>
    <element name="ProgramURL" type="anyURI" minOccurs="0"/>
    <element name="InstanceMetadataId"
      type="tva:InstanceMetadataIdType" minOccurs="0"/>
```

-continued

```
    <element name="InstanceDescription"
      type="tva:InstanceDescriptionType" minOccurs="0"/>
  </sequence>
</complexType>
```

The following is an example of TV Anytime data describing the broadcasting of an audiovisual content:

```
<BroadcastEvent serviceIDRef = "hbc100022311">
  <Program crid="crid://hbc.com/foxes/episode11"/>
  <ProgramURL>dvb://1.4ee2.3f5/</ProgramURL>
  <PublishedStartTime>2001-04-07T19:00:00.00+01:00</PublishedStartTime>
  <PublishedDuration>PT6H</PublishedDuration>
  <Live value="false"/>
  <Repeat value="true"/>
  <FirstShowing value="false"/>
  <LastShowing value="false"/>
  <Free value="false"/>
</BroadcastEvent>
    <Program crid="crid://hbc.com/foxes/episode11"/>
identifies the audiovisual content.
    <ProgramURL>dvb://1.4ee2.3f5/</ ProgramURL>
identifies the broadcast channel.
    <PublishedStartTime>2001-04-07T19:00:00.00+01:00</PublishedStartTime> indicates the broadcast time.
```

The invention expands the definition of the element <ProgramURL> to allow the designation of a plurality of components that are available separately. The following are added:

the secondary component type: for example audio, subtitle, video (for example TC2*a*, TC2*b* in the foregoing description with reference to FIG. 1), the secondary component language: for example French, English, etc. (for example LC2*a*, LC2*b* in the foregoing description with reference to FIG. 1), the address at which the secondary component can be acquired, which can be a multicast address, http URL or FTP URL, a DVB channel, etc. (ADa, ADb in the foregoing description with reference to FIG. 1).

The TV Anytime description data as modified in accordance with the invention is as represented below, for example, with the elements added or modified by the invention underlined.

```
<complexType name="ProgramLocationType" abstract="true">
  <sequence>
    <element name="Program" type="tva:CRIDRefType"/>
    <element name="ProgramURL" type="ProgramURLType" minOccurs="0"
```

```
            maxOccurs="unbounded"/>
     <element name="InstanceMetadataId"
   type="tva:InstanceMetadataIdType" minOccurs="0"/>
     <element name="InstanceDescription"
   type="tva:InstanceDescriptionType" minOccurs="0"/>
    </sequence>
</complexType>
<complexType name="ProgramURLType">
   <complexContent>
      <extension base="anyURI">
         <attribute name="type" type="ComponentType"
   use="optional"/>
         <attribute name="language" type="mpeg7:ExtendedLanguageType"
   use="optional"/>
       </extension>
    </complexContent>
</complexType>
<simpleType name="ComponentType">
    <restriction base="string">
       <enumeration value="Audio"/>
       <enumeration value="Video"/>
       <enumeration value="ClosedCaptions"/>
    </restriction>
</simpleType>
```

For example, the description data is as shown below in the case of a main component made up of video, audio in French and subtitles in English and a secondary component made up of audio in English acquired in multicast mode via the Internet and subtitles in German acquired by downloading via the Internet.

```
<BroadcastEvent serviceIDRef = "hbc100022311">
    <Program crid="crid://hbc.com/foxes/episode11"/>
    <ProgramURL>dvb://1.4ee2.3f5/</ProgramURL>
    <ProgramURL type="Audio" language="en">
          igmp://234.2.2.2;audio 49170 RTP-AVP 0/</ProgramURL>
    <ProgramURL type="Audio" language="de">
http://www.channelFrance.com/titanic/de_audio.wav</ProgramURL>
    <ProgramURL type="ClosedCaptions" language="de">
rtsp://www.channelFrance.com/titanic/de/closedCaptions.st</
ProgramURL>
    <PublishedStartTime>2001-04-
07T19:00:00.00+01:00</PublishedStartTime>
    <PublishedDuration>PT6H</PublishedDuration>
    <Live value="false"/>
    <Repeat value="true"/>
    <FirstShowing value="false"/>
    <LastShowing value="false"/>
    <Free value="false"/>
</BroadcastEvent>
```

The invention claimed is:

1. A method of receiving broadcast television signals on a multimedia receiver terminal, in which method a main component of television signals broadcast via a first source is received in the multimedia receiver terminal, wherein main content reproduction advance time stamps referenced to a predetermined reference time are inserted beforehand into the main component to mark content reproduction advance;

a secondary component for associating with the main component in order to reproduce for the user a coherent audiovisual content made up both of the main component and of the secondary component is acquired in the multimedia receiver terminal via a second source adapted to send secondary components, secondary content reproduction advance time stamps referenced to said predetermined reference time being inserted into the secondary component prior to reproduction in order to mark content reproduction advance; and the received main component and the acquired secondary component are reproduced on the multimedia receiver terminal in compliance with the chronology of the secondary content reproduction advance time stamps and the main content reproduction advance time stamps, to reproduce for the user a coherent audiovisual content made up both of the main component and of the secondary component, and wherein the main content reproduction advance time stamps each have a main value of the time elapsed since said predetermined reference time;

the secondary content reproduction advance time stamps each have a secondary value of the time elapsed since said predetermined reference time; and the presence of a main content reproduction advance time stamp in the received main component is detected, the acquired secondary component is searched for a secondary content reproduction advance time stamp having a secondary value immediately greater than the main value of the detected main content reproduction advance time stamp, and reproduction of the acquired secondary component is started from the secondary content reproduction advance time stamp obtained by means of said search, the secondary content reproduction advance time stamps being spaced relative to the main content reproduction advance time stamps.

2. A method according to claim 1, wherein said predetermined reference time is a published start time of reproduction of the content of the main component.

3. A method according to claim 1, wherein the main component includes, in addition to said main content reproduction advance time stamps referenced to said predetermined reference time, second main time stamps that are not referenced to said predetermined referenced time and are respectively associated with said main content reproduction advance time stamps referenced to said predetermined referenced time;

in the secondary component, the secondary content reproduction advance time stamps are modified to have the same time reference as the second main time stamps of the main component by adding to the secondary content reproduction advance time stamps the time shift between the main content reproduction advance time stamps referenced to said predetermined reference time and the second main time stamps that are not referenced to said predetermined reference time and are respectively associated with said main content reproduction advance time stamps; and said reproduction of the received main component and the acquired secondary component on the multimedia receiver terminal is effected on the basis of the chronology of the modified secondary content reproduction advance time stamps of the secondary component and the second main time stamps of the received main component, which are not referenced to said predetermined reference time.

4. A method according to claim 1, wherein the secondary content reproduction advance time stamps are present from the outset in the secondary component acquired from the second source in the multimedia receiver terminal.

5. A method according to claim 1, wherein the secondary content reproduction advance time stamps are inserted into the secondary component in the multimedia receiver terminal after acquisition in the multimedia receiver terminal from the second source.

6. A method according to claim 1, wherein the step of acquiring the secondary component includes storing the secondary component received from the second source in a buffer of the multimedia receiver terminal and the step of reproducing on the multimedia receiver terminal (T) the received main component and the acquired secondary component includes extracting the stored secondary component from the buffer.

7. A method according to claim 6, wherein the secondary component is acquired by interrogating an address of the source of secondary components to be found in description data present with the main component in the received television signals followed by downloading from the secondary component source to the multimedia receiver terminal.

8. A method according to claim 6, wherein the secondary component is acquired by interrogating an address of the source of secondary components to be found in description data present in metadata broadcast independently and received beforehand by the terminal or consulted beforehand by the terminal at a known address, followed by downloading from the secondary component source to the multimedia receiver terminal.

9. A method according to claim 7, wherein the description data includes for each identifier of a secondary component the secondary component type selected from at least audio, subtitle and video, the secondary component language, and the respective address in the second source at which to obtain the secondary component.

10. A method according to claim 6, wherein the secondary component is acquired from the second source with the aid of a manual search engine and downloaded from the second source to the multimedia receiver terminal.

11. A method according to claim 6, wherein the secondary component is acquired by sending the secondary component to the multimedia receiver terminal from the second source in multicast mode by the secondary component source and storing the secondary component in the buffer.

12. A method according to claim 6, wherein the secondary component is acquired by downloading the secondary component into the buffer and reading the buffer in streaming mode.

13. A method according to claim 1, wherein the main content reproduction advance time stamps include a main wanted content interruption time stamp and a main wanted content resumption time stamp after the main wanted content interruption time stamp, between which time stamps is a content unwanted in the main component, and which are synchronized in the secondary component respectively with a first secondary wanted content time stamp and a second secondary wanted content time stamp that is after the secondary wanted content time stamp, the secondary component between the first secondary wanted content time stamp and the second secondary wanted content time stamp corresponding to a wanted content other than the unwanted content of the main component.

14. A computer-readable medium storing a program including code instructions which when executed perform at least the reception, acquisition and reproduction steps of a method according to claim 1 when used in a terminal or module for receiving broadcast television signals.

15. A module for receiving broadcast television signals, the module including means for receiving in a multimedia receiver terminal a main component of television signals broadcast via a first source and means for reproducing an audiovisual content for the user based on the received main component, wherein the module further includes means for acquiring from a second source a secondary component associated with the main component to reproduce for the user a coherent audiovisual content made up both of the main component and of the secondary component;

means for automatically controlling the reproduction means so that the reproduction means reproduce the received main component and the acquired secondary component in compliance with the chronology of the secondary content reproduction advance time stamps, referenced to a predetermined reference time and each having a secondary value of the time elapsed since said predetermined reference time, and main content reproduction advance time stamps, referenced to said predetermined reference time and each having a main value of the time elapsed since said predetermined reference time; and means for detecting the presence of a main content reproduction advance time stamp in the received main component, for searching, in the acquired secondary component, for a secondary content reproduction advance time stamp having a secondary value immediately greater than the main value of the detected main content reproduction advance time stamp and to start reproduction of the acquired secondary component from the secondary content reproduction advance time stamp obtained by said search, the secondary content reproduction advance time stamps being spaced relative to the main content reproduction advance time stamps.

16. A receiver of broadcast television signals, the receiver including means for receiving in a multimedia receiver terminal a main component of television signals broadcast via a first source and means for reproducing an audiovisual content for the user based on the received main component, wherein the receiver further includes means for acquiring from a second source said secondary component associated with the main component to reproduce for the user a coherent audiovisual content made up both of the main component and of the secondary component;

means for automatically controlling the reproduction means so that the reproduction means reproduce the received main component and the acquired secondary component in compliance with the chronology of secondary content reproduction advance time stamps, referenced to a predetermined reference time and each having a secondary value of the time elapsed since said predetermined reference time, and main content reproduction advance time stamps, referenced to said predetermined reference time and each having a main value of the time elapsed since said predetermined reference time; and means for detecting the presence of a main content reproduction advance time stamp in the received main component, for searching, in the acquired secondary component, for a secondary content reproduction advance time stamp having a secondary value immediately greater than the main value of the detected main content reproduction advance time stamp and to start reproduction of the acquired secondary component from the secondary content reproduction advance time stamp obtained by said search, the secondary content reproduction advance time stamps being spaced relative to the main content reproduction advance time stamps.

17. A television signal broadcasting system including a first source of a broadcast main component of television signals intended for a multimedia receiver terminal, the television signal broadcasting system further including means for inserting into the main component main content reproduction advance time stamps referenced to a predetermined reference time and each having a main value of the time elapsed since said predetermined reference time;

a second source adapted to send a secondary component in which is inserted, before restitution, secondary content reproduction advance time stamps referenced to said predetermined reference time and each having a secondary value of the time elapsed since said predetermined reference time, the secondary content reproduction advance time stamps being spaced relative to the main content reproduction advance time stamps, said secondary component being intended to be acquired in a multimedia receiver terminal and to be associated with the main component to reproduce for the user a coherent audiovisual content made up both of the main component and of the secondary component;

the main component and the secondary component being viewed on the multimedia receiver terminal in compliance with the chronology of the secondary content reproduction advance time stamps and the main content reproduction advance time stamps, said chronology including detecting the presence of a main content reproduction advance time stamp in the main component, for searching, in the secondary component, for a secondary content reproduction advance time stamp having a secondary value immediately greater than the main value of the detected main content reproduction advance time stamp and to start reproduction of the secondary component from the secondary content reproduction advance time stamp obtained by said search.

18. The television signal broadcasting system according to claim 17, further comprising:

means for inserting into the secondary component said secondary content reproduction advance time stamps.

* * * * *